UNITED STATES PATENT OFFICE 2,163,094

INDIGOID DYESTUFFS

Eduard Kambli, Basel, Switzerland, assignor to Society of Chemical Industry in Basle, Basel, Switzerland No Drawing. Application October 7, 1936, Serial No. 104,544. In Switzerland October 14, 1935

12 Claims. (Cl. 8—28)

This invention relates to the manufacture of indigoid dyestuffs by condensing a reactive α-derivative of an isatin of the general formula

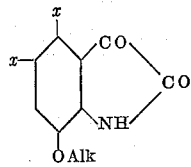

in which at least one $x$ stands for halogen, with a 1-hydroxynaphthalene capable of coupling and if desired treating the dyestuff thus obtained with a halogenating agent.

It has been found that in respect of color strength and purity of tint in dyeing especially good results are obtained if a mixture of the reactive α-derivatives of the isatins of the general formulas

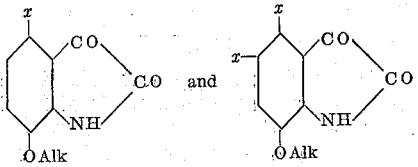

wherein $x$ represents halogen, is condensed with a 1-hydroxynaphthalene capable of being coupled and if desired the dyestuff thus produced is treated with a halogenating agent.

Reactive α-derivatives of isatin of the above general formula are for example, 4:5-dichloro-7-methoxyisatin-α-chloride, 4:5-dichloro-7-ethoxyisatin-α-chloride, 4:5-dichloro-7-methoxyisatin-α-anilide, 4-chloro-7-methoxyisatin-α-chloride, 4-chloro-7-ethoxyisatin-α-chloride, 5-chloro-7-methoxyisatin-α-anilide, as well as the reactive α-derivatives of 7-alkoxyisatin which contain bromine as a substituent in the 4- or 5-position or in both 4- and 5-position.

1-hydroxynaphthalenes capable of coupling with the reactive α-derivatives of isatin of the above general formula are, for example, 1-hydroxynaphthalene and the halogenated, alkylated and alkoxylated substitution products thereof, such as for example, 4-chloro-hydroxynaphthalene and 4-bromo-hydroxynaphthalene, 4-methoxy-1-hydroxynaphthalene, 4-ethoxy-1-hydroxynaphthalene and 5-methoxy-1-hydroxynaphthalene.

The process is particularly advantageous when there is used for the condensation a reactive α-derivative of an isatin such as can be obtained by halogenating 4-halogen-7-alkoxyisatins whose halogen content corresponds with more than one atom and less than two atoms, or by mixing indigoid dyestuffs obtainable by condensation of a reactive α-derivative on the one hand of an isatin of the general formula

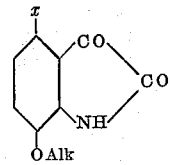

and on the other hand of an isatin of the general formula

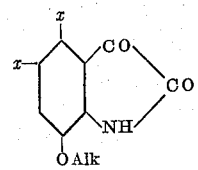

wherein $x$ represents halogen, with a 1-hydroxynaphthalene capable of coupling and if desired treating the mixture with a halogenating agent. These mixtures and preparations are particularly valuable when they contain at most 50 per cent., preferably only about 20–30 per cent., of the dyestuff from the 4-halogen-7-alkoxyisatin.

For this mixing there may be used, for example, dyestuff powders or dyestuff pastes or dyestuff preparations which contain the dyestuffs in a form particularly suitable for printing, or the leuco-compound of the dyestuff may be used.

The reactive α-derivative of the isatin may be condensed with the hydroxynaphthalene in aqueous medium or in presence of an organic solvent, for instance alcohol, glacial acetic acid, benzene, acetic acid anhydride.

By treating the dyestuff obtained with a halogenating agent, for instance chlorine, bromine or sulphuryl chloride, for instance in sulfuric acid or nitrobenzene solution the fastness of the dyeings may be enhanced; the dyestuffs may be converted into their leuco ester salts by the usual methods.

Dyestuffs obtainable by this invention are suitable for dyeing and, in particular, for printing various materials, for instance vegetable and animal fibres like cotton, wool and artificial silk from regenerated cellulose; the dyeings and prints obtained have various color tints and are very fast.

Of particular value are the dyestuff mixtures in which the 4-position of the naphthalene residue is occupied by halogen; these dyestuffs give when dyed and in particular printed on vegetable fibres such as cotton or artificial silk consisting of regenerated cellulose, blue dyeings and printings very fast to chlorine and of excellent fastness to light.

The following examples illustrate the invention, the parts being by weight:

Example 1

24.6 parts of 4:5-dichloro-7-methoxyisatin of melting point 272–274° C. are converted by heating with 22 parts of phosphorous pentachloride in 350 parts of chlorobenzene into the 4:5-dichloro-7-methoxyisatin-α-chloride and this product is mixed with a solution at 45–50° C. of 18 parts of 4-chloro-1-hydroxynaphthalene in 500 parts of chlorobenzene. The dyestuff thus obtained in the form of a blue crystalline powder of the formula

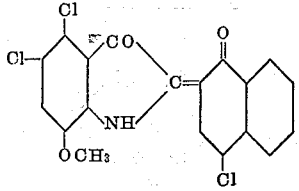

is filtered and washed with chlorobenzene and with alcohol. It dissolves in concentrated sulfuric acid to a green solution and dyes cotton in a green-yellow vat blue tints. Prints on cotton attained with this dyestuff are characterised by their good fastness to washing, chlorine and light.

Example 2

To a suspension of 37.1 parts of the dyestuff of the formula

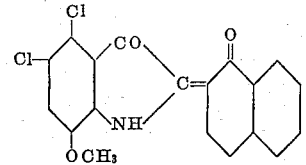

obtained in the usual manner by condensing 4:5-dichloro-7-methoxyisatin-α-chloride of melting point 272–274° C. with 1-hydroxynaphthalene in 600 parts of chlorobenzene there are added 2 grams of antimony pentachloride and 16 grams of sulfuryl chloride. The chlorinating reaction is started by slowly raising the temperature to 70° C., sulfurdioxide and hydrogen chloride being evolved. By stirring for 1 hour at 65–70° C. the reaction is completed. After cooling, filtering and washing the solid matter with chlorobenzene and with alcohol and drying there is attained a chlorination product which is identical with the dyestuff described in Example 1.

Example 3

A solution of 23.3 parts of 4-bromo-1-hydroxynaphthalene in 500 parts of chlorobenzene is heated to 50° C. and mixed with a solution of 4-chloro-5-bromo-7-methoxyisatin-α-chloride made by heating 29 parts of 4-chloro-5-bromo-7-methoxyisatin of melting point 272° C. with 22 parts of phosphorous pentachloride and 300 parts of chlorobenzene. The dyestuff of the formula

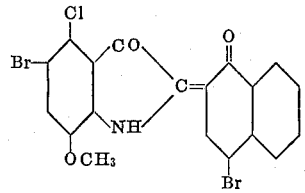

separates in the form of a blue crystalline powder; it is filtered after cooling and washed with chlorobenzene and with alcohol. It dissolves in concentrated sulfuric acid to a blue-green solution and yields in cotton printing a very pure greenish blue tint of good fastness to chlorine and light.

Example 4

A solution of 4-chloro-5-bromo-7-methoxyisatin-α-chloride made by heating 29 parts of 4-chloro-5-bromo-7-methoxyisatin of melting point 272° C. with 22 parts of phosphorous pentachloride and 300 parts of chlorobenzene is mixed with a solution at 50° C. of 18 parts of 4-chloro-1-hydroxynaphthalene. The dyestuff of the formula

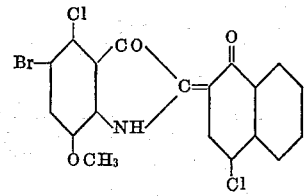

which separates in the form of a blue crystalline powder is filtered when cold and washed with chlorobenzene and with alcohol. It dissolves in concentrated sulfuric acid to a blue-green solution and yields in cotton printing a pure greenish blue tint of good fastness to chlorine and light.

Example 5

A solution of 4-chloro-7-methoxyisatin-α-chloride obtained by heating 21.1 parts of 4-chloro-7-methoxyisatin with 22 parts of phosphorous pentachloride in 300 parts of chlorobenzene is mixed with a solution at about 50° C. of 18 parts of 4-chloro-1-hydroxynaphthalene. The dyestuff of the formula

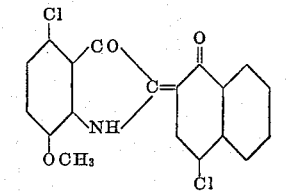

which separates in the form of a dark bronze crystalline powder is washed with chlorobenzene and with alcohol. It dissolves in concentrated sulfuric acid to a greenish blue solution and yields in cotton printing a pure blue tint of good fastness to chlorine.

Example 6

To a solution of 4-chloro-5-bromo-7-methoxyisatin-α-chloride made by heating 29 parts of 4-chloro-5-bromo-7-methoxyisatin of melting point 272–274° C. with 22 parts of phosphorous pentachloride in 400 parts of chlorobenzene there is added at 45–50° C. a solution at 50 C. of 15 parts of 1-hydroxynaphthalene in 200 parts of chlorobenzene. After stirring for a short time at about 50° C. the dyestuff suspension is cooled to 5–10° C. and there is added a solution of 16 parts of bromine in 100 parts of chlorobenzene. The bromination which soon sets in is carried to an end by gradually raising the temperature to about 45–50° C. After cooling, filtering and washing with chlorobenzene and with alcohol there is obtained a dyestuff in the form of a blue sandy crystalline powder. It is identical with the product described in Example 3.

*Example 7*

23 parts of a chlorinated 4-chloro-7-methoxyisatin of melting point 265–268° C. and containing 25–27 per cent. of chlorine (the content for 4:5-dichloro-7-methoxyisatin is theoretically 28.8 per cent.) are converted into the corresponding isatin-α-chloride by heating them with 22 parts of phosphorous pentachloride in 350 parts of chlorobenzene and the mixture thus obtained is mixed with a solution made at 45–50° C. of 18 parts of 4-chloro-1-hydroxynaphthalene in 500 parts of chlorobenzene. The dyestuff mixture consisting of the two dyestuffs of the formulas

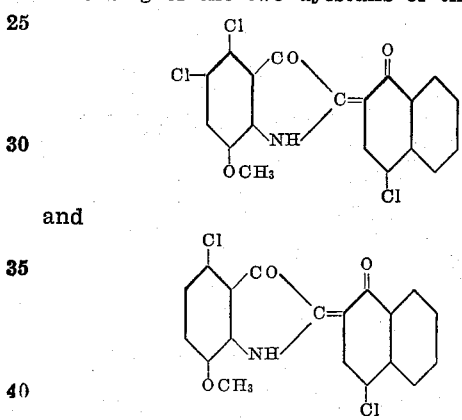

and which separates in the form of a blue crystalline powder is washed with chlorobenzene and with alcohol and dried. It has a chlorine content of 23–25 per cent., dissolves in concentrated sulfuric acid to a green solution and dyes cotton in a green yellow vat blue tints. It is particularly suitable for printing, yielding on cotton vivid blue tints of very good fastness to washing and chlorine as well as being excellently fast to light.

The chlorinated 4-chloro-7-methoxyisatin used in this example may be made as follows:

To a suspension of 21.1 parts of 4-chloro-7-methoxyisation in 100 parts of glacial acetic acid are added 15 parts of sulfuryl chloride. By gradually raising the temperature to about 70° C. the chlorination is started with evolution of hydrogen chloride and sulfurdioxide. After stirring for 2 hours at 70–80° C. the whole is allowed to cool. The separated chlorination product is filtered, washed with some glacial acetic acid and dried; it has a chlorine content of 25–27 per cent. and a melting point of 265–268° C. Its chlorine content shows that it is a mixture of 4-chloro-7-methoxyisatin (Cl=16.78 per cent.) and 4:5-dichloro-7-methoxyisatin (Cl=28.86 per cent.).

If the chlorination is conducted in the presence of a catalyst such as iodine, ferric chloride, antimony trichloride or antimony pentachloride, a chlorination product of like properties is obtained.

*Example 8*

23 parts of a chlorinated 4-chloro-7-methoxyisatin of melting point 265–268° C. and a chlorine content of 25–27 per cent. are converted by heating with 22 parts of phosphorous pentachloride and 300 parts of chlorobenzene into the corresponding isatin α-chloride and this is mixed with a solution at about 50° C. of 23.3 parts of 4-bromo-1-hydroxynaphthalene in 500 parts of chlorobenzene. The dyestuff mixture consisting of the two dyestuffs of the formulas

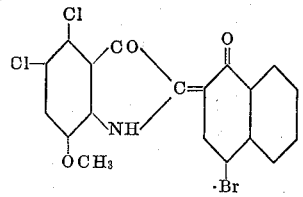

and

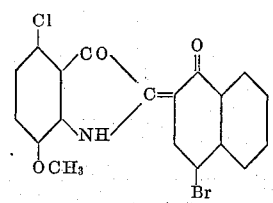

which separates in the form of a blue crystalline powder is filtered and washed with chlorobenzene and with alcohol; it dissolves in concentrated sulfuric acid to a blue-green solution. In cotton printing it yields a pure greenish blue tint of good fastness to chlorine and light.

*Example 9*

60 parts of the dyestuff obtained by condensing 4:5-dichloro-7-methoxyisatin-α-chloride with 4-chloro-1-hydroxynaphthalene in chlorobenzene are mixed with 40 parts of the condensation product from 4-chloro-7-methoxyisatin-α-chloride with 4-chloro-1-hydroxynaphthalene and the mixture is stirred with 800 parts of sulfuric acid for 1 hour at room temperature. By pouring the mass into water the dyestuff is precipitated; it is washed free from acid and ground with the necessary quantity of water to form a printing paste.

In the grinding operation there can obviously be added to the dyestuff paste additions such as glycerine or reduction accelerators like anthraquinone, particularly β-hydroxyanthraquinone or hydrotropic agents, for instance, a salt of benzylaniline sulfonic acid or a salt of para-toluene sulfonic acid. Color pastes obtained in this manner print on cotton blue tints which have a very good fastness to washing, chlorine and light.

*Example 10*

10 parts of the dyestuff mixture obtained by condensing a mixture of isatin-α-chloride prepared from 8 parts of 4:5-dichloro-7-methoxyisatin, 2 parts of 4-chloro-7-methoxyisatin and 9.5 parts of phosphorous pentachloride in chlorobenzene with 8 parts of 4-chloro-1-hydroxynaphthalene are ground to produce a paste of 10 per cent. strength with 20 parts of glycerine and 70 parts of water. This paste yields fast tints in printing.

The properties of this dyestuff paste, particularly its depth of color in printing, may be improved by admixture of the additions indicated in Example 9.

*Example 11*

After condensing an isatin-α-chloride mixture made by heating 9 parts of 4:5-dichloro-7-methoxyisatin, 1 part of 4-chloro-7-methoxyisatin and 9 parts of phosphorous pentachloride in chlorobenzene, with 7.5 parts of 4-chloro-1-hydroxynaphthalene at 40–50° C. in chlorobenzene, 10 parts of the condensation product are stirred with 100 parts of sulfuric acid for 1 hour at room temperature, and then converted into a printing paste as described in Example 9, if desired with the admixture of the additional substances named therein; this paste yields in cotton printing blue tints which are similar to those obtained with the paste described in Example 9.

What I claim is:

1. Indigoid dyestuffs of the general formula

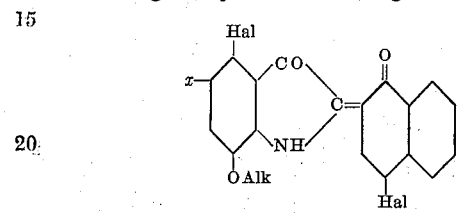

wherein $x$ represents a member of the group consisting of hydrogen and halogen, which dyestuffs are blue powders dissolving in concentrated sulfuric acid to green solutions and yielding on cotton very fast blue prints which are particularly fast to washing, chlorine and light.

2. Indigoid dyestuffs of the general formula

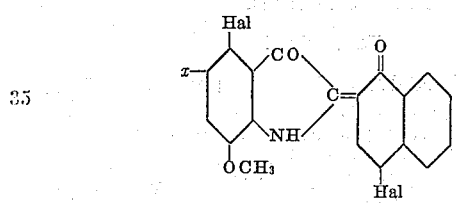

wherein $x$ represents a member of the group consisting of hydrogen and halogen, which dyestuffs are blue powders dissolving in concentrated sulfuric acid to green solutions and yielding on cotton very fast blue prints which are particularly fast to washing, chlorine and light.

3. Indigoid dyestuffs of the general formula

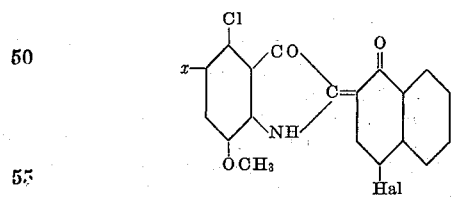

wherein $x$ represents a halogen atom, which dyestuffs are blue powders dissolving in concentrated sulfuric acid to green solutions and yielding on cotton very fast blue prints which are particularly fast to washing, chlorine and light.

4. The indigoid dyestuff of the formula

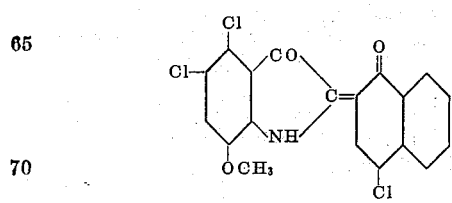

which dyestuff is a blue powder dissolving in concentrated sulfuric acid to a blue solution and yielding on cotton very fast blue prints which are particularly fast to washing, chlorine and light.

5. The indigoid dyestuff of the formula

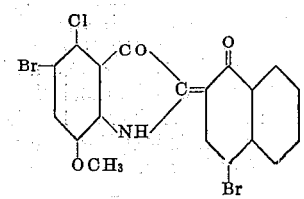

which dyestuff is a blue powder dissolving in concentrated sulfuric acid to a green solution and yielding on cotton very fast blue prints which are particularly fast to washing, chlorine and light.

6. Dyestuff mixtures containing at the least 50 per cent of a dyestuff of the general formula

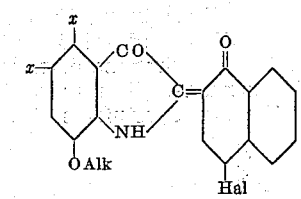

and at the most 50 per cent of a dyestuff of the general formula

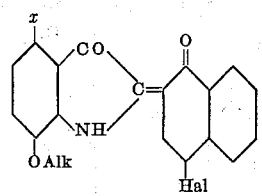

wherein $x$ represents in both formulas a halogen atom and which dyestuff mixtures are blue powders dissolving in concentrated sulfuric acid to green solutions and yielding on cotton very fast blue prints which are particularly fast to washing, chlorine and light.

7. Dyestuff mixtures containing at the least 50 per cent of a dyestuff of the general formula

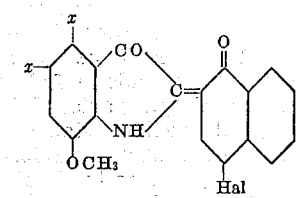

and at the most 50 per cent of a dyestuff of the general formula

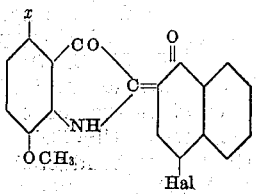

wherein $x$ represents in both formulas a halogen atom, which dyestuff mixtures are blue powders dissolving in concentrated sulfuric acid to green solutions and yielding on cotton very fast blue prints which are particularly fast to washing, chlorine and light.

8. Dyestuff mixtures containing at the least 50 per cent of a dyestuff of the general formula

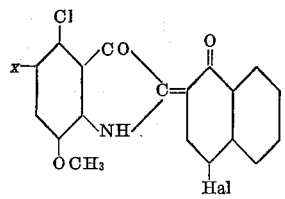

wherein $x$ represents a halogen atom and at the most 50 per cent of a dyestuff of the general formula

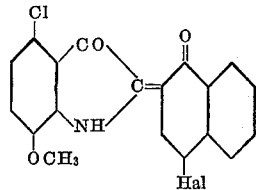

which dyestuff mixtures are blue powders dissolving in concentrated sulfuric acid to green solutions and yielding on cotton very fast blue prints which are particularly fast to washing, chlorine and light.

9. Dyestuff mixtures containing at the least 50 per cent of a dyestuff of the general formula

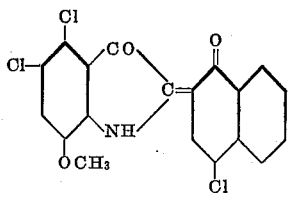

and at the most 50 per cent of a dyestuff of the general formula

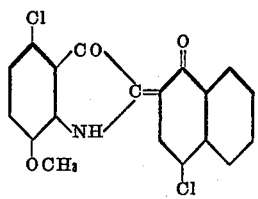

which dyestuff mixtures are blue powders dissolving in concentrated sulfuric acid to green solutions and yielding on cotton very fast blue prints which are particularly fast to washing, chlorine and light.

10. Dyestuff mixtures containing at the least 50 per cent of a dyestuff of the general formula

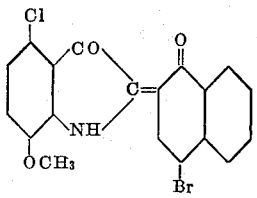

and at the most 50 per cent of a dyestuff of the general formula which dyestuff mixtures are blue powders dissolving in concentrated sulfuric acid to green solutions and yielding on cotton very fast blue prints which are particularly fast to washing, chlorine and light.

11. Dyestuff mixtures containing 70 to 80 per cent of the dyestuff of the formula

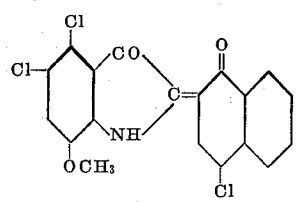

and 20 to 30 per cent of the dyestuff of the formula

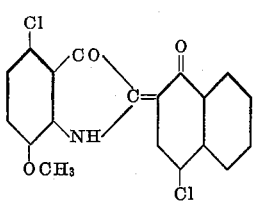

which dyestuff mixtures are blue powders dissolving in concentrated sulfuric acid to green solutions and yielding on cotton very fast blue prints which are particularly fast to washing, chlorine and light.

12. Dyestuff mixtures containing 70 to 80 per cent of the dyestuff of the formula and 20 to 30 per cent of the dyestuff of the formula

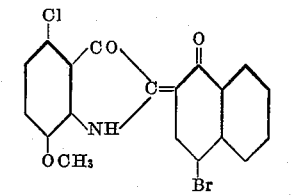

which dyestuff mixtures are blue powders dissolving in concentrated sulfuric acid to green solutions and yielding on cotton very fast blue prints which are particularly fast to washing, chlorine and light.

EDUARD KAMBLI.